United States Patent [19]

Thayer

[11] 4,012,470
[45] Mar. 15, 1977

[54] SEWAGE TREATMENT AERATION SYSTEMS

[75] Inventor: Paul M. Thayer, Milwaukee, Wis.

[73] Assignee: Water Pollution Control Corporation, Milwaukee, Wis.

[22] Filed: June 27, 1975

[21] Appl. No.: 591,259

Related U.S. Application Data

[63] Continuation of Ser. No. 342,586, March 19, 1973, abandoned, which is a continuation-in-part of Ser. No. 168,685, Aug. 3, 1971, Pat. No. 3,902,676.

[52] U.S. Cl. .............................. 261/122; 138/171; 248/74 R; 285/286
[51] Int. Cl.² .......................................... B01F 3/04
[58] Field of Search .............. 261/121 R, 122–124; 248/49, 74 R, 74 A; 138/171, 111, 112; 285/61, 286

[56] References Cited

UNITED STATES PATENTS

| | | | |
|---|---|---|---|
| 1,470,529 | 10/1923 | Gerber | 248/74 R X |
| 2,221,346 | 11/1940 | Durdin, Jr. | 261/124 |
| 2,297,165 | 9/1942 | Ringel | 138/112 X |
| 2,357,375 | 9/1944 | Atkinson | 248/74 R |
| 2,769,647 | 11/1956 | Harstick et al. | 285/61 X |
| 3,242,072 | 3/1966 | Walker | 261/124 X |
| 3,406,371 | 10/1968 | Buckeridge | 285/61 X |
| 3,501,133 | 3/1970 | Drier et al. | 261/124 |
| 3,615,078 | 10/1971 | Thayer | 261/123 |
| 3,781,000 | 12/1973 | Paasschens | 261/124 |
| 3,785,629 | 1/1974 | McKinney | 261/122 |
| 3,802,676 | 4/1974 | Thayer | 261/122 |

Primary Examiner—Tim R. Miles
Assistant Examiner—Richard L. Chiesa
Attorney, Agent, or Firm—Pollock, Vande Sande & Priddy

[57] ABSTRACT

An aeration system for a sewage treatment tank including headers having connectors longitudinally spaced along the header, the connectors being adapted to receive air diffusers; means supporting the header horizontally in a tank; and means for rotating the header on its axis to level the connectors.

9 Claims, 18 Drawing Figures

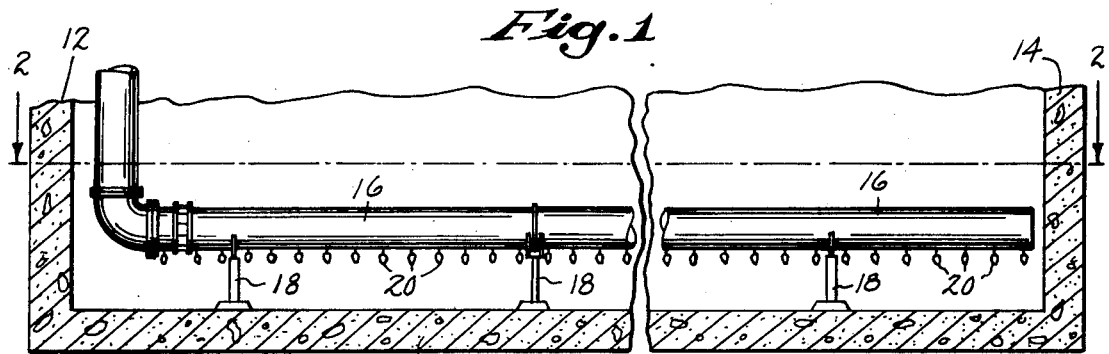
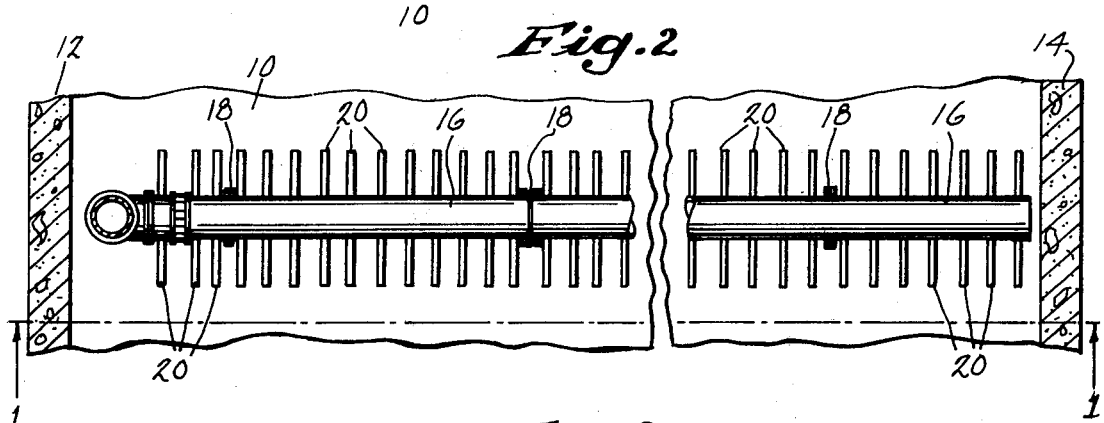
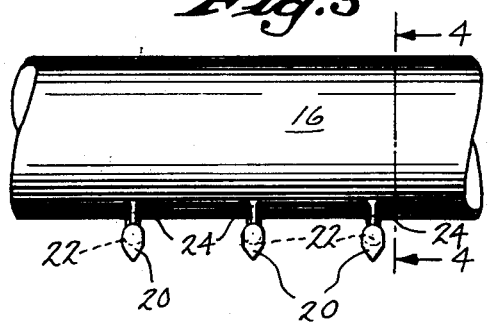
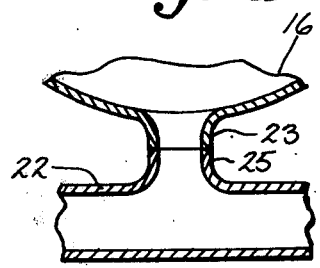
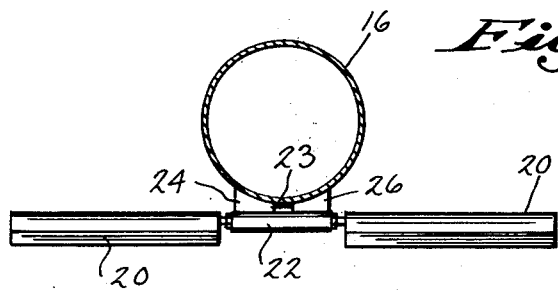

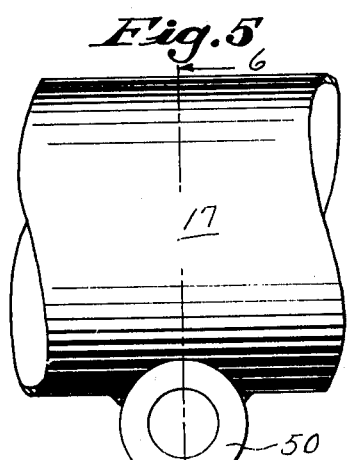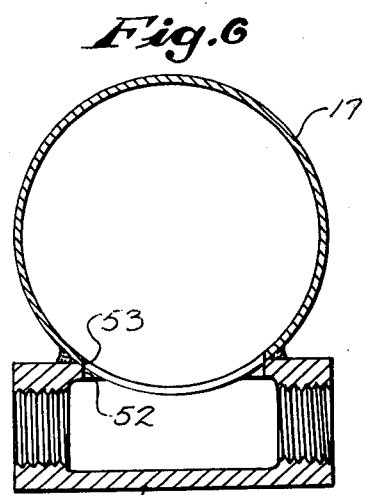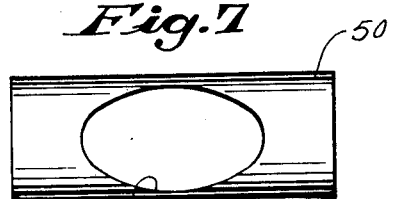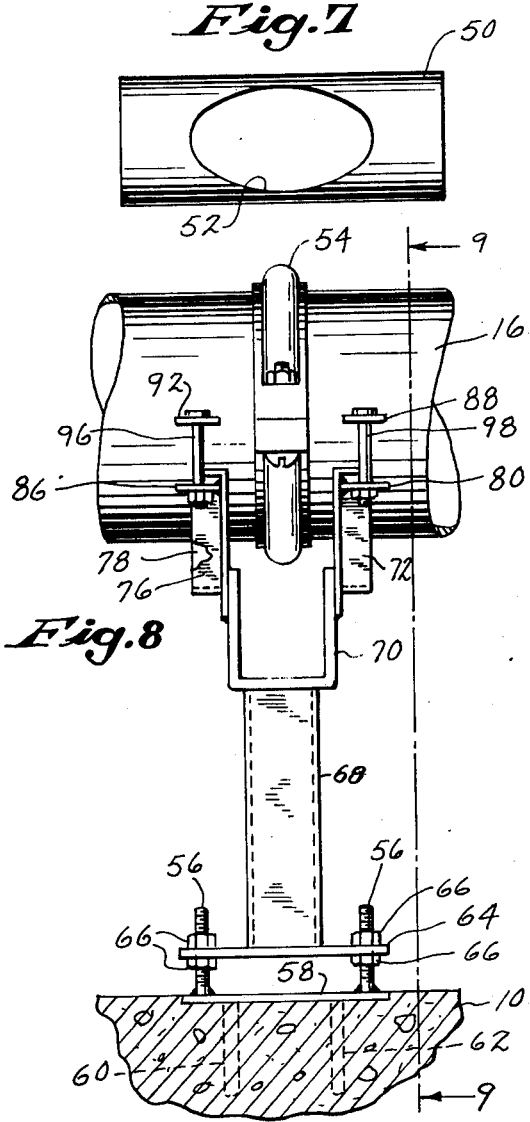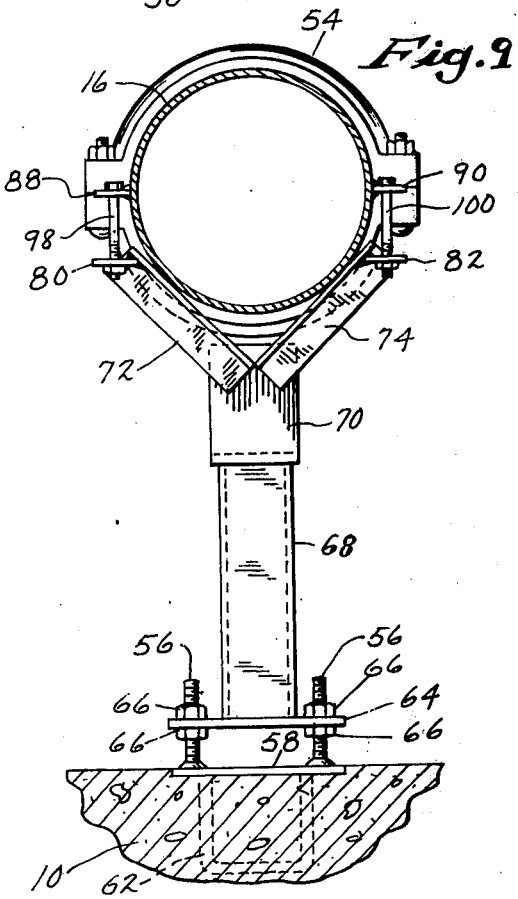

SEWAGE TREATMENT AERATION SYSTEMS

RELATED APPLICATIONS

This application is a continuation of application Ser. No. 342,586 filed Mar. 19, 1973, now abandoned, which application in turn is a continuation-in-part of application Ser. No. 168,685 filed Aug. 3, 1971, now U.S. Pat. No. 3,902,676.

BACKGROUND OF THE INVENTION

In sewage treatment plants, the incoming sewage, together with activated sludge, flows progressively and relatively slowly through the aerating tanks. During this time it is subjected to aeration by means of air diffusers in the tank, and the successful treatment of sewage depends heavily upon the efficient transfer of oxygen into the mixed liquor in the tank. In large tanks, the air diffusers also perform the function of inducing circulation of the liquor in the tank in a predetermined circulatory pattern. In the case of large tanks, the positioning of the air diffusers becomes critical and must be held within tight tolerances when the diffusers are installed in the tank so that the liquor to be aerated will follow the proper circulation paths for most effective aeration. For instance, with certain types of diffusers which project laterally from connectors spaced along a header, it is important, both from the standpoint of diffuser operation and liquor circulation, that the headers be accurately aligned in a horizontal direction. Heretofore this has been accomplished by various methods which were both time consuming and relatively inaccurate. Standard pipe sections and fittings are often prepared on the construction site and are installed in the best way possible. However, the tolerances associated with the use of standard fittings and techniques makes leveling and alignment in the field very difficult and inaccurate.

Accordingly, it is an object of this invention to provide improved aeration systems in sewage treatment tanks wherein the headers and diffusers can be readily brought to an accurate level position during installation without complicated alignment procedures.

A further object of this invention is to provide improved apparatus for supporting a header in an accurately aligned horizontal position within a sewage treatment tank.

DESCRIPTION OF THE DRAWINGS

FIG. 1 is an elevational view of a header of this invention installed in a sewage treatment tank, part being broken away;

FIG. 2 is a plan view of the header shown in FIG. 1;

FIG. 3 is an enlarged elevational view of a portion of the header shown in FIGS. 1 and 2;

FIG. 4 is a cross-sectional view taken along the line 4—4 of FIG. 3;

FIG. 4A is an enlarged fragmentary cross-sectional view of the joint between the header and diffuser;

FIG. 5 is an enlarged elevational view of a different type of connection between the header and connector;

FIG. 6 is a cross-sectional view taken along the line 6—6 of FIG. 5;

FIG. 7 is a plan view of one of the connectors alone, of the type of FIGS. 5 and 6;

FIG. 8 is an enlarged fragmentary elevational view of the supporting and rotating structure for the headers shown in FIGS. 1 and 2; and FIG. 9 is a cross-sectional view taken on the line 9—9 of FIG. 8.

DETAILED DESCRIPTION OF VARIOUS EMBODIMENTS OF THE INVENTION

Figure 10:
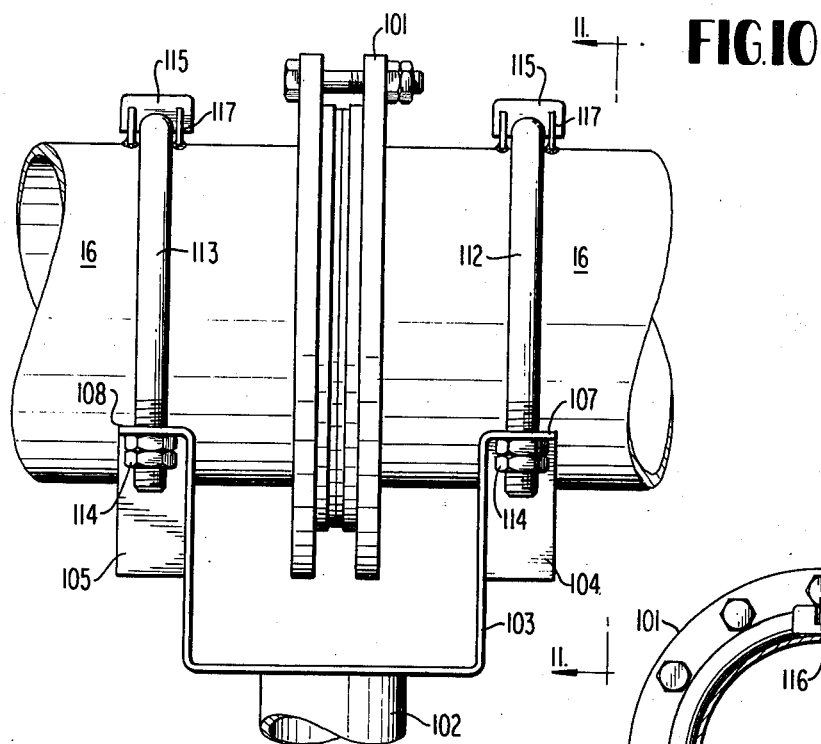
FIG. 10 is an enlarged fragmentary elevational view of an alternative supporting and rotating structure for the headers shown in FIGS. 1 and 2.

Referring to FIGS. 1 and 2, there is shown one header installed in the bottom of a sewage treatment tank. In the practical application of this invention, a plurality of headers may be used in any one sewage treatment tank. One type of installation is disclosed in detail in my co-pending application Ser. No. 881,709, which was filed on Dec. 3, 1969, now U.S. Pat. No. 3,615,078 for an "Apparatus for and Method of Aerating Liquor in Large Sewage Treatment Tanks". The relationship between the headers and the tank is disclosed in said co-pending patent application. Since the present invention does not deal with the relationship between the headers, however, only a single header is disclosed in the drawings of this application.

In FIGS. 1 and 2, the sewage treatment tank is represented by a concrete floor 10 and two concrete side walls 12 and 14. The header 16 can be supported on any portion of the tank but is preferably supported on the tank bottom 10 by means of supporting members 18, hereinafter described in greater detail. Projecting laterally from the header 16 are any suitable diffusers 20 which are attached to any suitable diffuser connectors 22. The connectors may have two ends, each having a diffuser connected thereto or, in certain header installations, such as near a wall, there may be a diffuser at one end only of a connector. The preferred diffusers 20 are described in my U.S. Pat. No. 3,424,443, which was issued on Jan. 28, 1969, for an "Apparatus for Diffusing Gas into a Liquid".

This invention is principally concerned with the combination of headers 16, connectors 22, and diffusers 20 with supporting apparatus which will accurately position the headers 16 and diffusers 20 in a predetermined plane, e.g. horizontal, at the proper location to produce the desired circulatory effect on the liquid in the sewage treatment tank.

In accordance with the preferred embodiment of FIGS. 4 and 4A, the connectors 22 have nipples 25 drawn therefrom which are welded to short nipples 23 drawn from the bottom of header 16. Each connector 22 is accurately aligned with, e.g. parallel to other connectors 22. Brackets 24 and 26, cut to accurately fit in the space between connectors 22 and header 16, and then welded in position, may be helpful in maintaining each connector 22 with its axis perpendicular or at any desired angle to the axis of header 16.

FIGS. 5, 6, and 7 show one of the many other connector configurations that can be used in place of the configuration shown in FIGS. 3, 4 and 4A. In this modification a straight connector 50 has an oval-shaped opening 52 cut therein and a matching oval-shaped opening 53 is cut into a header 17. The connector 50 is then joined to the header 17 by placing the two oval cut-outs together and welding the connector 50 to the header 17 along the juncture of the connector and the header.

In the fabrication of the header and connector assemblies it is preferable to use precision fixtures so that the connectors will be attached to the headers very accurately with respect to their alignment relative to the axis of the header and to each other. And, in addition to the connectors 22 or 50, means must be mounted upon the header for connection with header supports and for providing for the adjustability of the header when it is supported within the sewage treatment tank.

FIGS. 8 and 9 show a support means for supporting and rotating the header in the tank. The illustrated support is positioned at a joint between two sections of the header 16. These sections are joined together by an airtight clamp 54, which can be any suitable type of prior art clamp that will provide an airtight joint between the two header sections. The bottom of the header support rests on four bolts 56 which project upwardly from a floor plate 58. The plate is cast into the sewage treatment tank floor 10 and is secured therein by two downwardly-depending U-shaped members 60 and 62. A bottom plate 64 having four openings formed therein is adjustably disposed upon the bolts 56 by means of nuts 66 which are positioned both below and above the plate 64. An I-beam or pipe or other vertical member 68 is attached to the center of the plate 64 and supports a U-shaped bracket 70 which supports two V-shaped cradles comprising the arms 72, 74, 76, and 78. Each of the arms 72, 74, 76, and 78 is fitted at the upper extremity of the arm with corresponding horizontal lugs 80, 82, and 86, and a fourth lug which is behind lug 82 in FIG. 9. Each of the lugs 80, 82, and 86 has an opening therein to receive a bolt which depends downwardly from matching lugs 88, 90, and 92, all of which are welded to the sides of header 16. The lugs 88, 90, and 92 have openings therein for receiving bolts 96, 98, and 100. A fourth bolt which cannot be seen in the drawings engages a pair of lugs like the lugs 90 and 82, behind bolt 100 in FIG. 9 and on the other side of the pipe from bolt 96 in FIG. 8. The bolts 96, 98, 100 and the unseen bolt provide a means for rotating the header sections 16 about their longitudinal axis during the installation process so as to align the axes of the connectors attached thereto in the horizontal plane. The bolts 56 which project up from the floor plate 58 provide a means of leveling the base support of the header 16 both vertically and horizontally.

From the foregoing description, and from the accompanying drawings, which are identical with those of parent application Ser. No. 168,685, filed Aug. 3, 1971, and now U.S. Pat. No. 3,802,676. it is apparent that a joint formed by the adjoining ends of two header sections is positioned in cradle means defined by a support member, the latter being secured to the tank and adapted to receive and support said adjoining ends. Rotation means is provided, connected between the header and said support. The rotation means, on adjustment thereof, will rotate the header about its longitudinal axis. Adjustment of the rotation means provides a way of aligning the connectors. Thus, whether the connectors and/or diffusers ae intended to be horizontal or otherwise, the axes of the connectors on all the header sections can be accurately aligned. Having cradle means on either side of the joint, as shown in FIG. 8, can place and keep the adjoining ends of header sections in axial alignment as they are installed on the support and rotated. Those skilled in the art will readily understand that the opposite ends of a header section which is thus rotated, will be free to rotate. Such opposite end may be mounted, for instance, in a suitable slip- or expansion-joint supported in alignment with the header axis.

As indicated in Ser. No. 168,685 various modifications of the foregoing and possible without departing from the scope of the invention. Thus, several alternate supporting and rotating means falling within the scope of the invention will now be discussed. These include versions wherein there are separate or common means for rotating the headers and securing them, wherein the attachment between the peripheral surface of the header and the rotating means is above, alongside or beneath the header, wherein the rotating means encircles the header or not, and wherein the rotation means include a threaded member or members attached to the support means, or to a point on the header surface or to a band encircling the header. These are but a few of many variations falling within the scope of the invention.

Figure 11:
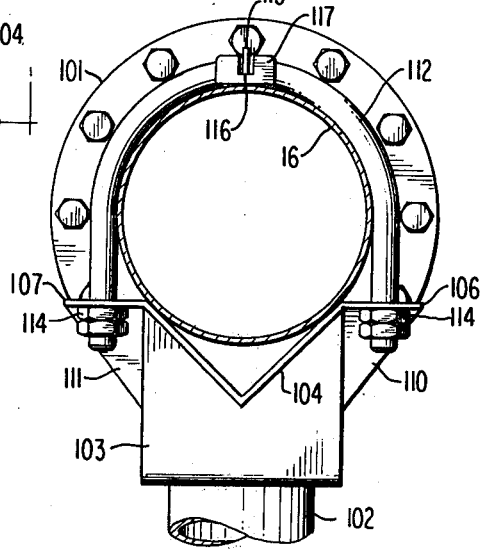
FIG. 11 is a cross-sectional view taken on the line 11—11 of FIG. 10.
Figure 12:
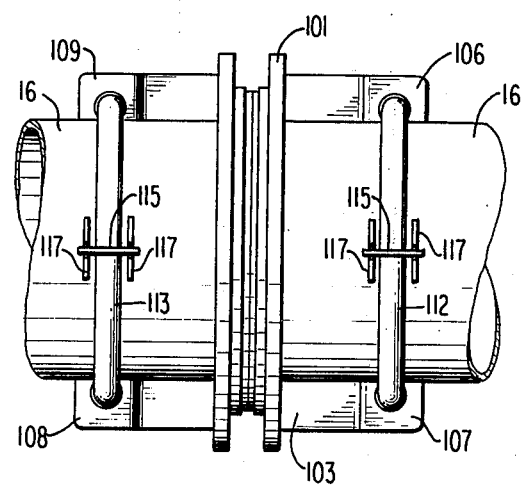
FIG. 12 is a top view of the supporting and rotating structure of FIG. 10.

FIGS. 10, 11 and 12 show the preferred support means for supporting and aligning the header in the tank. This support is also positioned at a joint between two sections of the header 16, which are shown in end-to-end relationship in FIGS. 10 and 12. They are joined together by any suitable type of prior art flange coupling 101 that will provide an airtight joint between the two header sections. The bottom of the header support (not shown) rests on the concrete floor 10 of the sewage treatment tank and may be secured therein by anchor bolts and a hold-down bar or any other suitable arrangement.

A vertical support member 102 is attached to the bottom of the support and supports a U-shaped bracket 103. Two V-shaped cradles 104 and 105, formed in the bracket, are provided with laterally extended lugs 106, 107, 108 and 109. The latter are supported by trungular braces such as 110 and 111 extending between the lugs and the lateral edges of U-bracket 103. Through apertures in lugs 106–109 extend the ends of specially prepared U-bolts 112 and 113, which encircle the header, bridging across the header. A transverse clip 115 is secured to the apex of each U-bolt, for connection, i.e. engagement, with slots 116 in each of two slotted clips 117, the latter being secured to the header 16 perpendicular to clip 115 and to the longitudinal axis of the header. Tightening double nuts 114 on U-bolts 112 and 113 secures the header sections in cradles 104 and 105. Tightening the fastening and adjusting nuts 114 more tightly on one side of the header longitudinal axis than on the other side cants the U-bolt and its clip 115. This in turn urges rotary movement of header 16, rotational force being applied from clip 115 to the header via slot 116 and clips 117.

Figure 13:
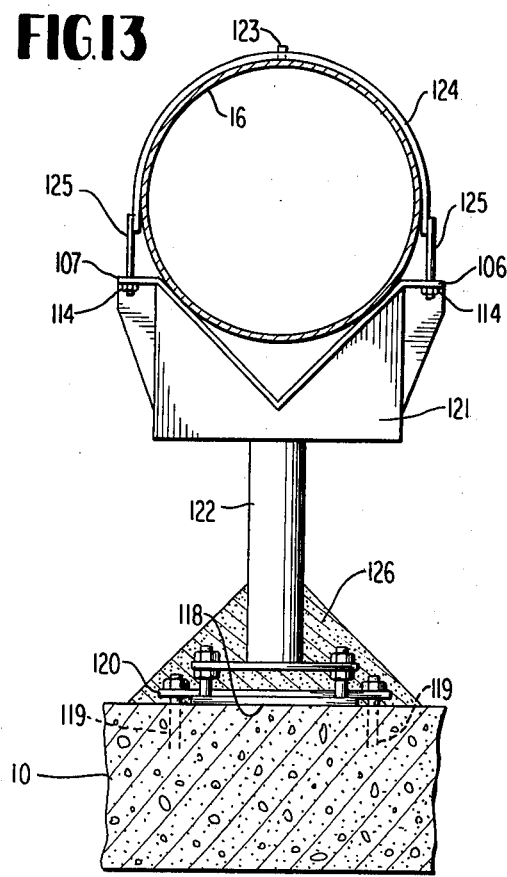
FIG. 13 is a cross-sectional view of another alternative supporting and rotational apparatus for the headers shown in FIGS. 1 and 2.

The further illustrative embodiment of FIG. 13 includes a support member having bottom plate 118 secured to tank floor 10 by anchor bolts 119 and hold-down bar 120. Using a levelling arrangement like that shown in FIGS. 8 and 9, a two cradle bracket 121 (similar to that described in connection with FIGS. 10–12) is supported on vertical support member 122. The anchor bolts, levelling mechanism and lower end of member 122 may be protected by grouting 126 if needed. In this embodiment, the apexes of the header section ends have short, upright pins 123 welded thereto, for engaging holes of corresponding size in header encircling straps 124. To the ends of these straps are welded threaded studs 125 which extend into apertures in lugs 106 and 107. By unequal tightening of nuts 114 on one side of the header axis or the other, rotational force and motion are generated via a stud 125, strap 124, pin 123 and the header wall for aligning connectors and/or diffusers (not shown) such as have been described above.

Figure 14:
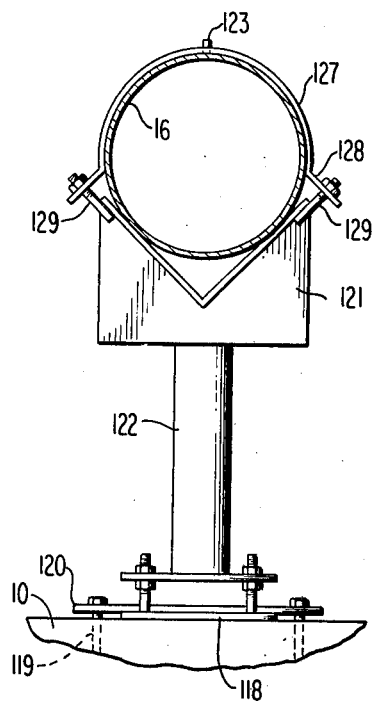
FIG. 14 is a cross-sectional view of still another alternative supporting and rotational means for the header means shown in FIGS. 1 and 2.

The embodiments of FIGS. 13 and 14 are similar, except that in FIG. 13 the points of attachment of the lugs and threaded studs are reversed. That is, the apertured lugs 128 are provided at the ends of header encircling straps 127, while the studs 129 are welded to the cradle or bracket 121. Tightening nuts 114 on one side of the header while loosening on the other side causes transmission of rotational force to header 16 via nuts 114, lugs 128, straps 127, and pins 123.

Figure 15:
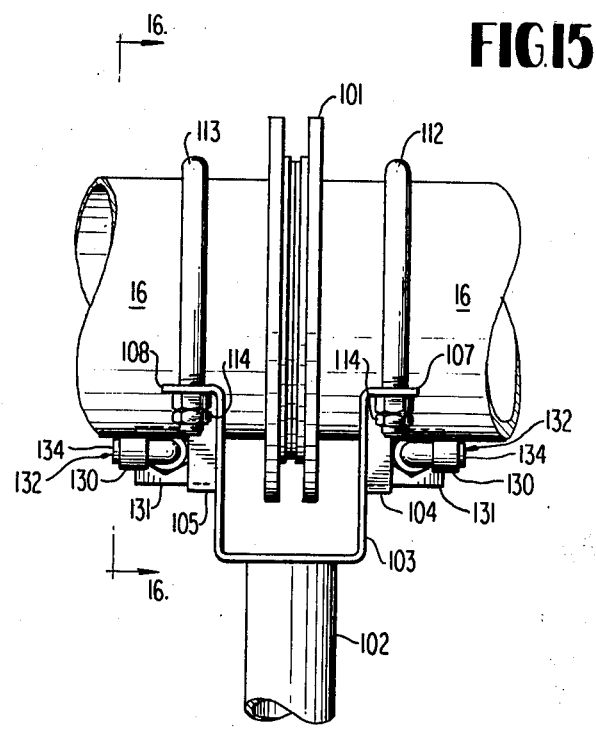
FIG. 15 is an enlarged fragmentary elevational view of an alternative supporting structure for the headers shown in FIGS. 1 and 2, in which are provided separate members for rotating the headers and for securing them to the support.
Figure 16:
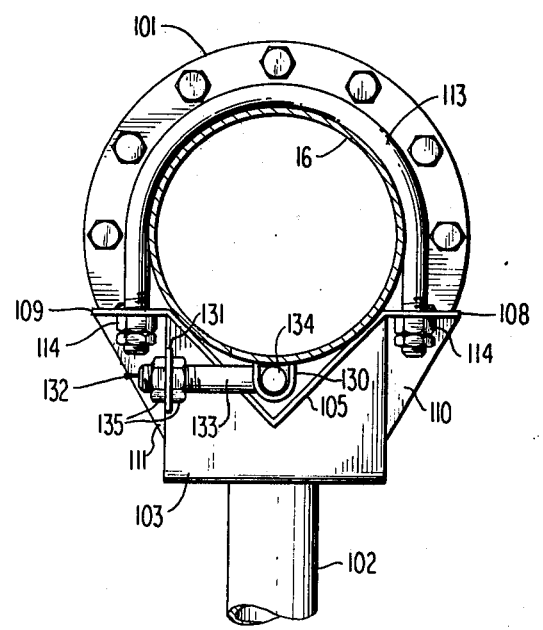
FIG. 16 is a cross-sectional view taken on line 16—16 of FIG. 15.

FIGS. 15 and 16 disclose an example of an embodiment in which separate members are provided for rotation means and for securing header sections to the support. This embodiment is the same as that shown in FIGS. 10–12, except as follows. Clips 115 and 117 may be dispensed with. The legs of U-clips 130 are welded to the undersides of header sections 16 adjacent cradles 104 and 105. Apertured lugs 131, disposed vertically in planes parallel to the header longitudinal axis, adjacent to and at approximately the same level vertically as U-clips 130, are attached by their lateral edges to bracket 103. L-bolts 132 have their threaded shank portions 133 extending through lugs 131, while their heads or perpendicularly bent ends 134 are connected to, i.e. engaged with or inserted in, U-clips 130. Nuts 135 threaded on shank portions 133 on both the inner and outer surfaces of lugs 131 may be advanced toward or away from the L-bolt heads to rotate header 16 clockwise or counterclockwise, respectively, as shown in cross-sectional view FIG. 16, about the header longitudinal axis.

Figure 17:
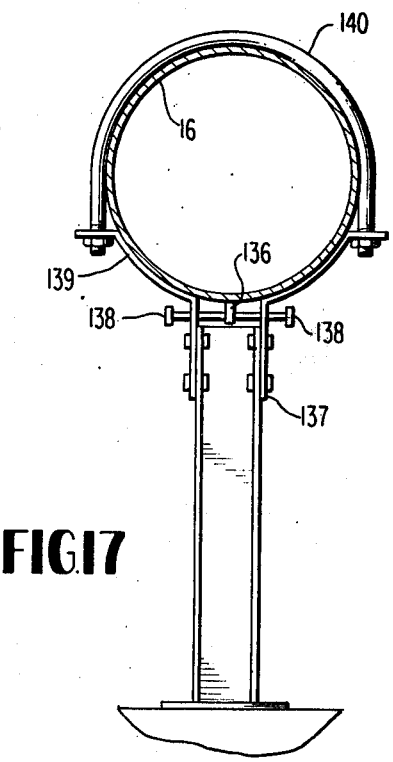
FIG. 17 is a cross-sectional view of a further alternative structure with separate members for securing the headers of FIGS. 1 and 2 to a support and for rotating them in said support.

FIG. 17 shows that the U-clips 130 of FIGS. 15, 16 may be replaced with tabs 136 dependent from the bottom of header 16 in a plane passing through the header axis. For the L-bolts are substituted bolts 138 threaded through holes in the support 137 perpendicular to and bearing against opposite sides of tabs 136. The header is secured to cradle means 139 by U-bolts 140, and the header may be rotated clockwise or counterclockwise as viewed in FIG. 17 by advancing the bolts 138 to the left or right, respectively.

From the foregoing, it may be seen that this invention provides improved aeration systems in sewage treatment tanks whereby the headers and diffusers can be readily aligned. And, although the invention has been described with reference to certain embodiments, it should be understood that the invention is by no means limited to the disclosed embodiments since modifications can be made in the disclosed structure without departing from the fundamental principles of operation thereof. For example, although the header described in this application has diffusers extending from both sides, it will be clear that in some applications it may be either necessary or desirable to have the diffusers extending from one side only of the header. In addition, although the disclosed supports for the header utilize two cradles to hold the headers, it may be desirable in some applications to utilize supports having only one cradle. These and many other modifications will be apparent to those skilled in the art, and this invention includes all such modifications falling within the scope of the following claims:

What is claimed is:

1. In an aeration system including header means arranged in a tank on support means in generally horizontal relationship with diffusers spaced at longitudinal intervals along said header means, the improvement which comprises means to adjust the orientation of said diffusers with regard to said tank by rotating said header means, said improvement comprising:
    first connecting means secured to the outer surface of said header means and integral therewith;
    second connecting means on said support means; and
    rotation means, connected between said first and second connecting means, for rotating said header means about its longitudinal axis to thereby adjust the orientation of said diffusers.

2. Apparatus according to claim 1 wherein said header means includes a plurality of header sections arranged in end-to-end relationship to provide joints between said sections, wherein said support means includes a support member having cradle means in which said joint is supported.

3. Apparatus according to claim 1 wherein said rotation means secures said header in said support means.

4. Apparatus according to claim 1 wherein said header includes a plurality of diffuser connectors spaced at longitudinal intervals along said header and extending transversely therefrom, and wherein said diffusers extend laterally and horizontally from said header.

5. Apparatus according to claim 1 wherein said first connecting means includes lug means secured to the outer surface of said header.

6. Apparatus according to claim 1 wherein said second connecting means includes lug means secured to said support means.

7. Apparatus according to claim 1 wherein said rotation means includes a first threaded member inter-connected with said first and second connecting means and a second threaded member engaging the second connecting member and threadedly engaging the first threaded member for rotating said header.

8. Apparatus according to claim 1 wherein said second connecting means includes lug means extending from said support means and said rotation means includes a threaded member interconnected with said first connecting means and extending through said lug means and a nut threadedly engaging said threaded member for advancement thereon against said lug means for rotating said header.

9. The apparatus of claim 1 in which said first connection means prevents relative movement between said rotation means and said header means whereby adjustment of said second connecting means causing rotation of said rotation means results in rotation of said header means about its longitudinal axis.

* * * * *